US012115643B1

(12) United States Patent
Cheng

(10) Patent No.: US 12,115,643 B1
(45) Date of Patent: Oct. 15, 2024

(54) PNEUMATIC TOOL

(71) Applicant: Ming Ta Cheng, Taichung (TW)

(72) Inventor: Yu-Hsun Cheng, Taichung (TW)

(73) Assignee: Ming Ta Cheng, Taichung (TW)

( * ) Notice: Subject to any disclaimer, the term of this patent is extended or adjusted under 35 U.S.C. 154(b) by 0 days.

(21) Appl. No.: 18/347,225

(22) Filed: Jul. 5, 2023

(51) Int. Cl.
*B25F 5/02* (2006.01)
*B25B 21/00* (2006.01)

(52) U.S. Cl.
CPC ................ *B25F 5/02* (2013.01); *B25B 21/00* (2013.01)

(58) Field of Classification Search
CPC ........................................................ B25F 5/02
See application file for complete search history.

(56) References Cited

U.S. PATENT DOCUMENTS 8,267,190 B2 * 9/2012 Li ............................ B25F 5/00 173/104
2014/0290973 A1 * 10/2014 Lin .......................... B25F 5/02 173/104

* cited by examiner

*Primary Examiner* — Nathaniel C Chukwurah
(74) *Attorney, Agent, or Firm* — RABIN & BERDO, P.C.

(57) ABSTRACT

A pneumatic tool has a shell, a setting space formed in the shell, a selector valve, an assembling hole, a through hole, and a positioning element. The selector valve is rotatably mounted in the setting space and has two positioning indentations formed on the selector valve at a spaced interval. The assembling hole is formed in the shell along a straight direction and communicates with the setting space. The through hole is formed in the shell between and communicates with the assembling hole and the setting space. The positioning element is disposed in the shell, is movably mounted in the assembling hole along the straight direction, abuts against the selector valve by an elastic element, and has a base and a protrusion. The protrusion is formed on the base, extends through the through hole, and abuts against one of the two positioning indentations of the selector valve.

20 Claims, 8 Drawing Sheets

PNEUMATIC TOOL

BACKGROUND OF THE INVENTION

1. Field of the Invention

The present invention relates to a pneumatic tool, and more particularly to a pneumatic tool having a valve-positioning assembly that can provide a positioning effect and can be operated safely.

2. Description of Related Art

A conventional pneumatic tool has an inlet channel, an outlet channel, a cylinder, and an output mechanism. In use, compressed air flows into the cylinder of the conventional pneumatic tool via the inlet channel to drive the output mechanism via a rotation of the cylinder. Then a hammering operation can be performed by a hammering device of the output mechanism to generate torque output. The conventional pneumatic tool has a selector valve disposed between the inlet channel and the outlet channel. A user can change a rotation direction of the cylinder of the conventional pneumatic tool by driving the selector valve to change a flowing direction of the compressed air, and this can switch the output torque of the conventional pneumatic tool between a forward rotation and a reverse rotation.

However, as the design of the output torque of the conventional pneumatic tool is getting higher and higher, the conventional pneumatic tool is subjected to higher anti-shock force in an actual use, which may cause the selector valve to be rotated by the above-mentioned anti-shock force to change the rotation direction of the cylinder under unknown circumstances. Then the output torque of the conventional pneumatic tool is switched, and this may lead to industrial safety accident and increase risk of use.

The pneumatic tool in accordance with the present invention mitigates or obviates the aforementioned problems.

SUMMARY OF THE INVENTION

The main objective of the present invention is to provide a pneumatic tool that can provide a positioning effect and can be operated safely.

The pneumatic tool in accordance with the present invention has a shell, a setting space formed in the shell, a selector valve, an assembling hole, a through hole, and a positioning element. The selector valve is rotatably mounted in the setting space and has two positioning indentations formed on the selector valve at a spaced interval. The assembling hole is formed in the shell along a straight direction and communicates with the setting space. The through hole is formed in the shell between and communicates with the assembling hole and the setting space. The positioning element is disposed in the shell, is movably mounted in the assembling hole along the straight direction, abuts against the selector valve by an elastic element, and has a base and a protrusion. The protrusion is formed on the base, extends through the through hole, and abuts against one of the two positioning indentations of the selector valve.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
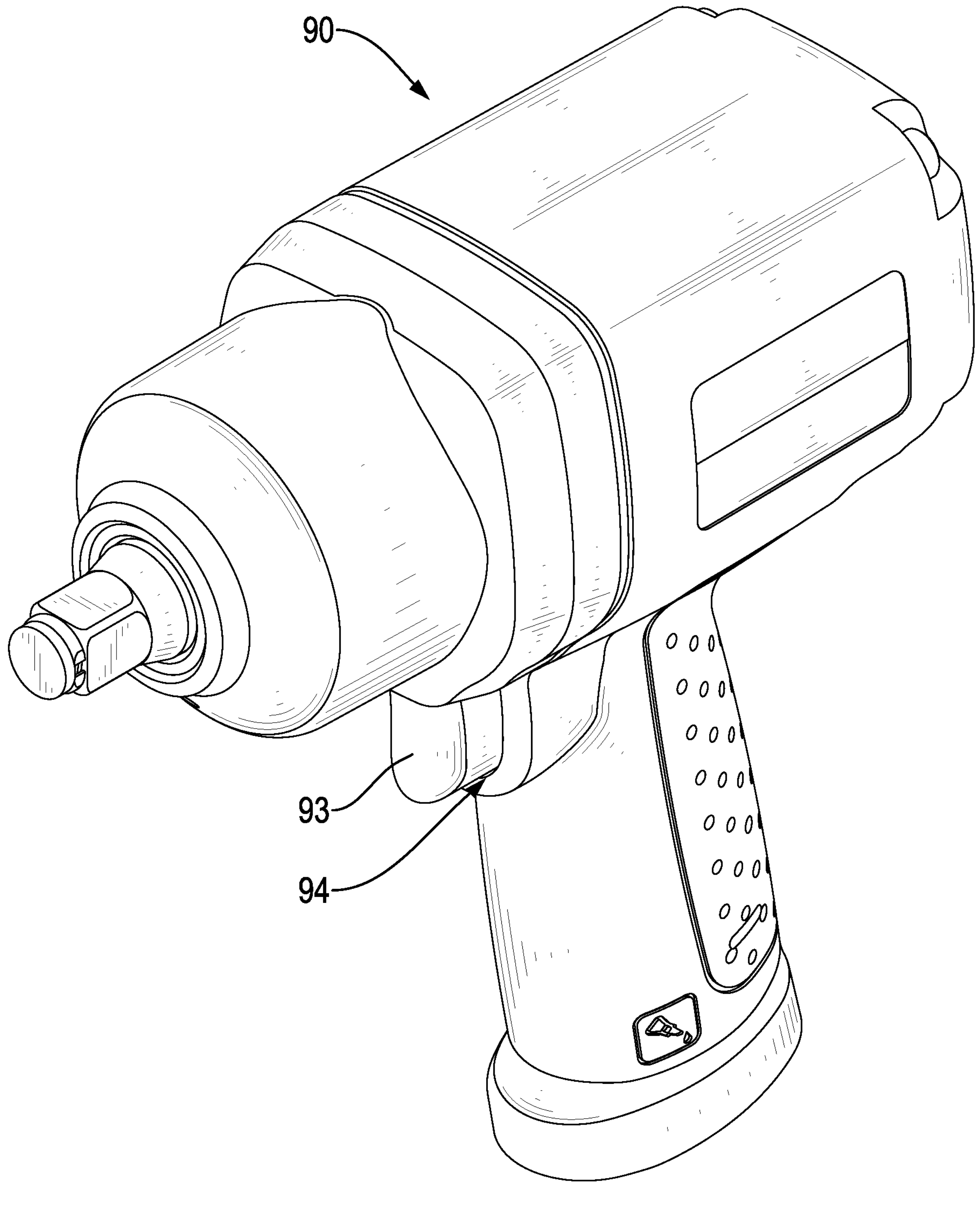
FIG. 1 is a top perspective view of a pneumatic tool in accordance with the present invention.
Figure 2:
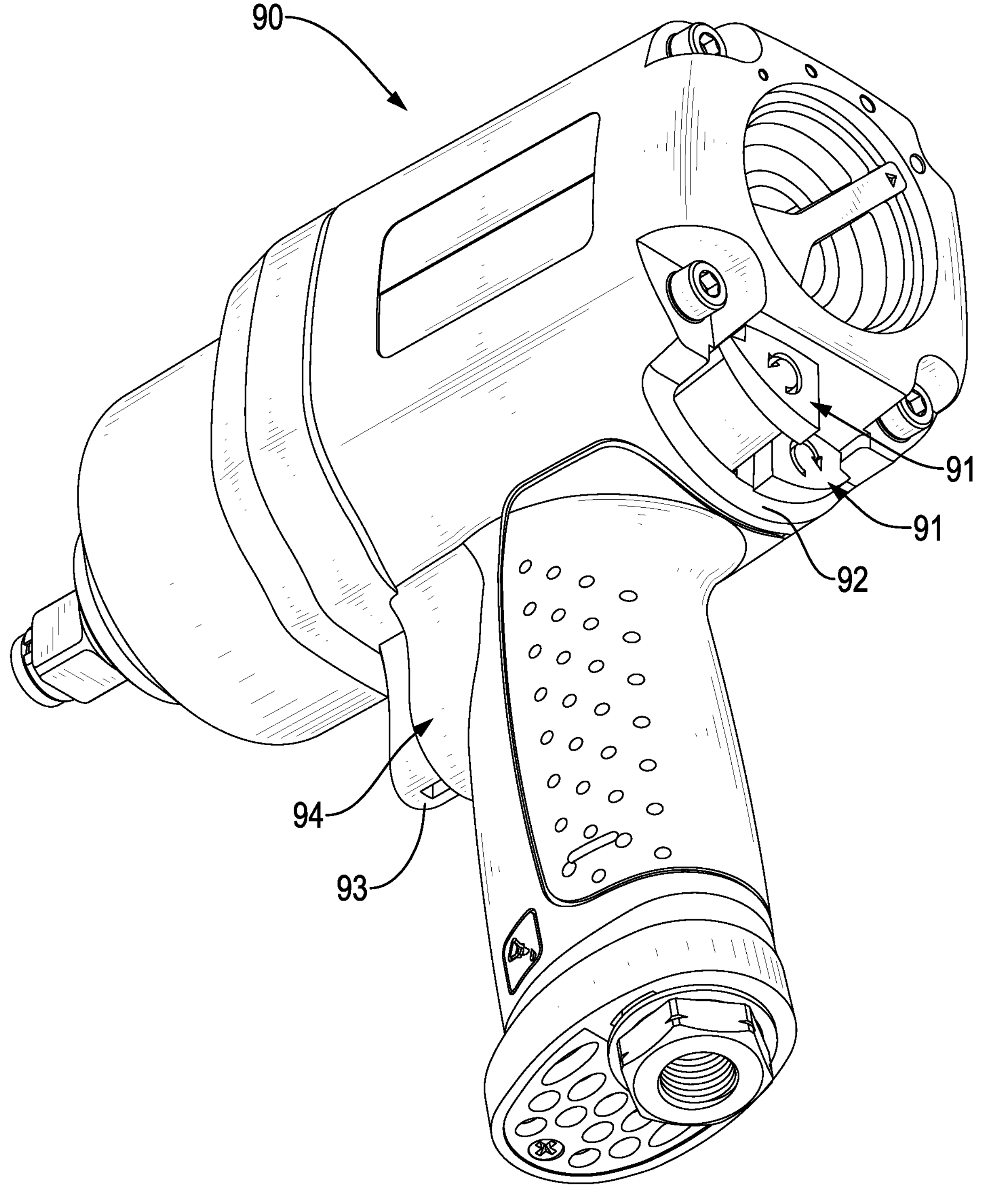
FIG. 2 is a bottom perspective view of the pneumatic tool in FIG. 1.
Figure 3:
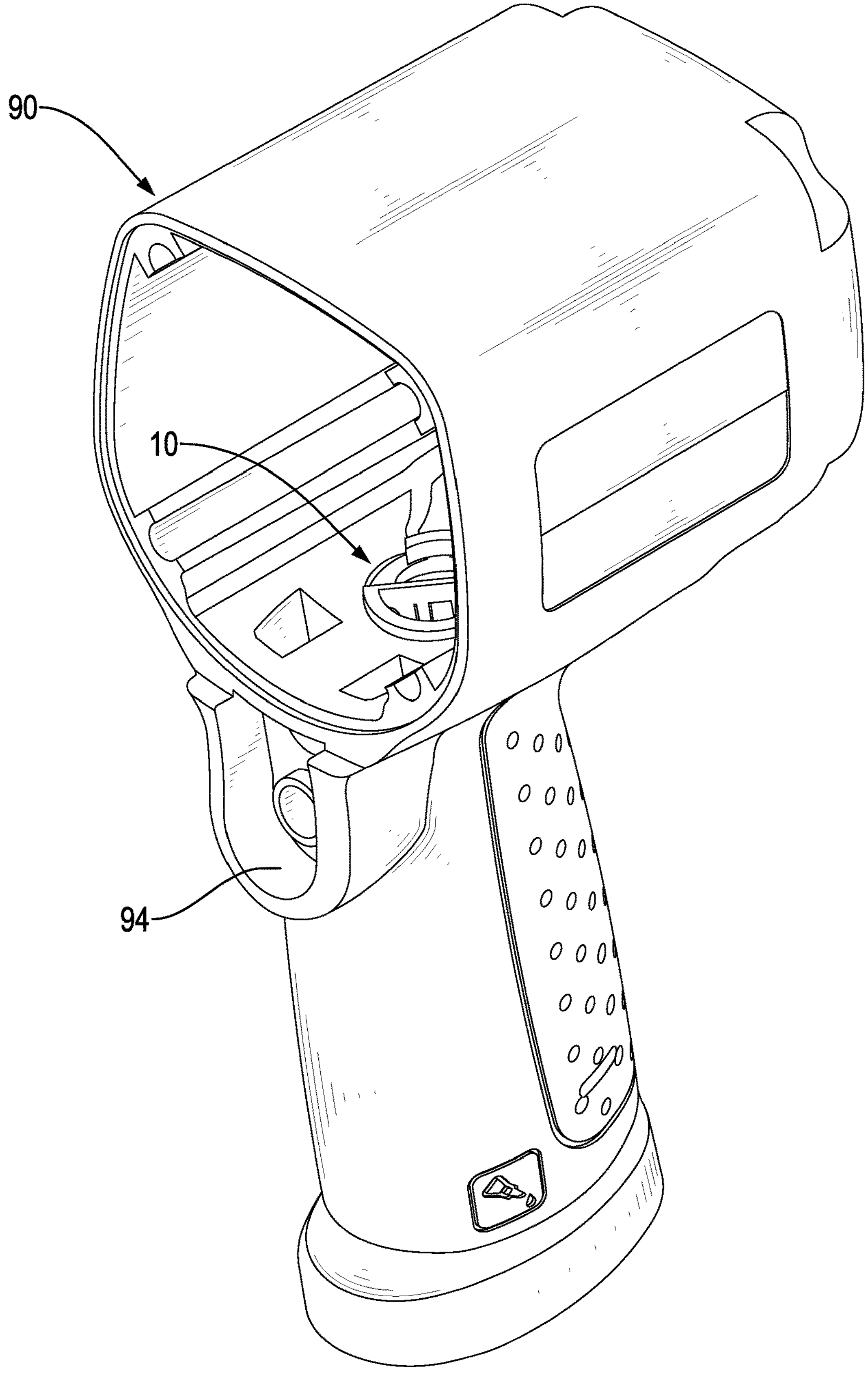
FIG. 3 is an enlarged perspective view of the pneumatic tool in FIG. 1, omitting some components.

With reference to FIGS. 1 to 4, a pneumatic tool 90 in accordance with the present invention has two switching stems 91, a stem-mounting portion 92, a trigger 93, a trigger-mounting portion 94, and a valve-positioning assembly. The two switching stems 91 are pushably disposed on the stem-mounting portion 92 of the pneumatic tool 90 to switch an output torque of the pneumatic tool 90. The trigger 93 is pressably and detachably disposed in a mounting recess of the trigger-mounting portion 94 to control an output of the pneumatic tool 90. The stem-mounting portion 92 and the trigger-mounting portion 94 are parts of a shell of the pneumatic tool 90. The valve-positioning device is disposed in the pneumatic tool 90 and has a setting space S, a selector valve 10, an assembling hole 20, a through hole 30, a mounting jacket 40, a fixing element 50, a spacer 60, an elastic element 70, and a positioning element 80.

Figure 4:
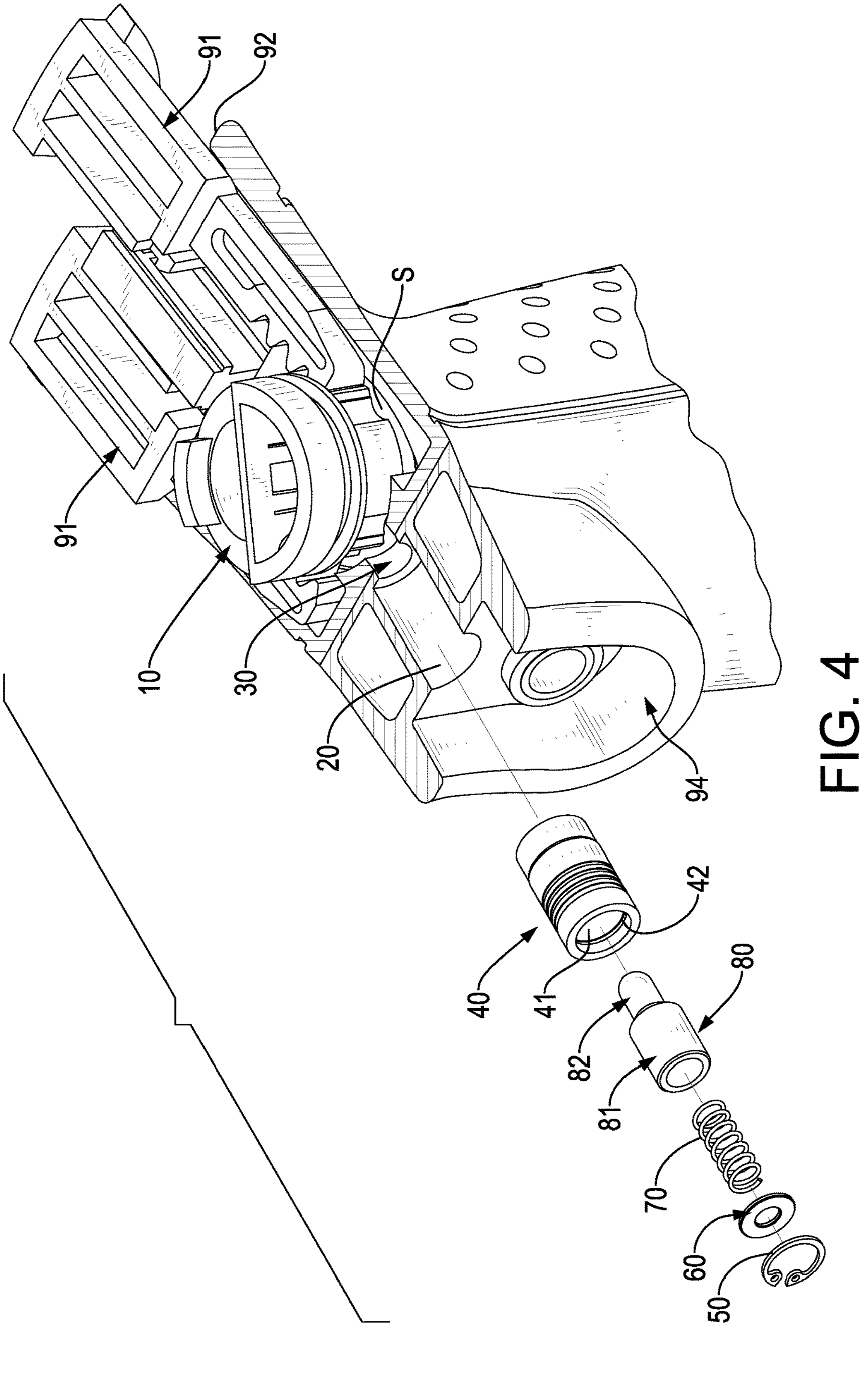
FIG. 4 is an enlarged and exploded perspective view of the pneumatic tool in FIG. 1.
Figure 5:
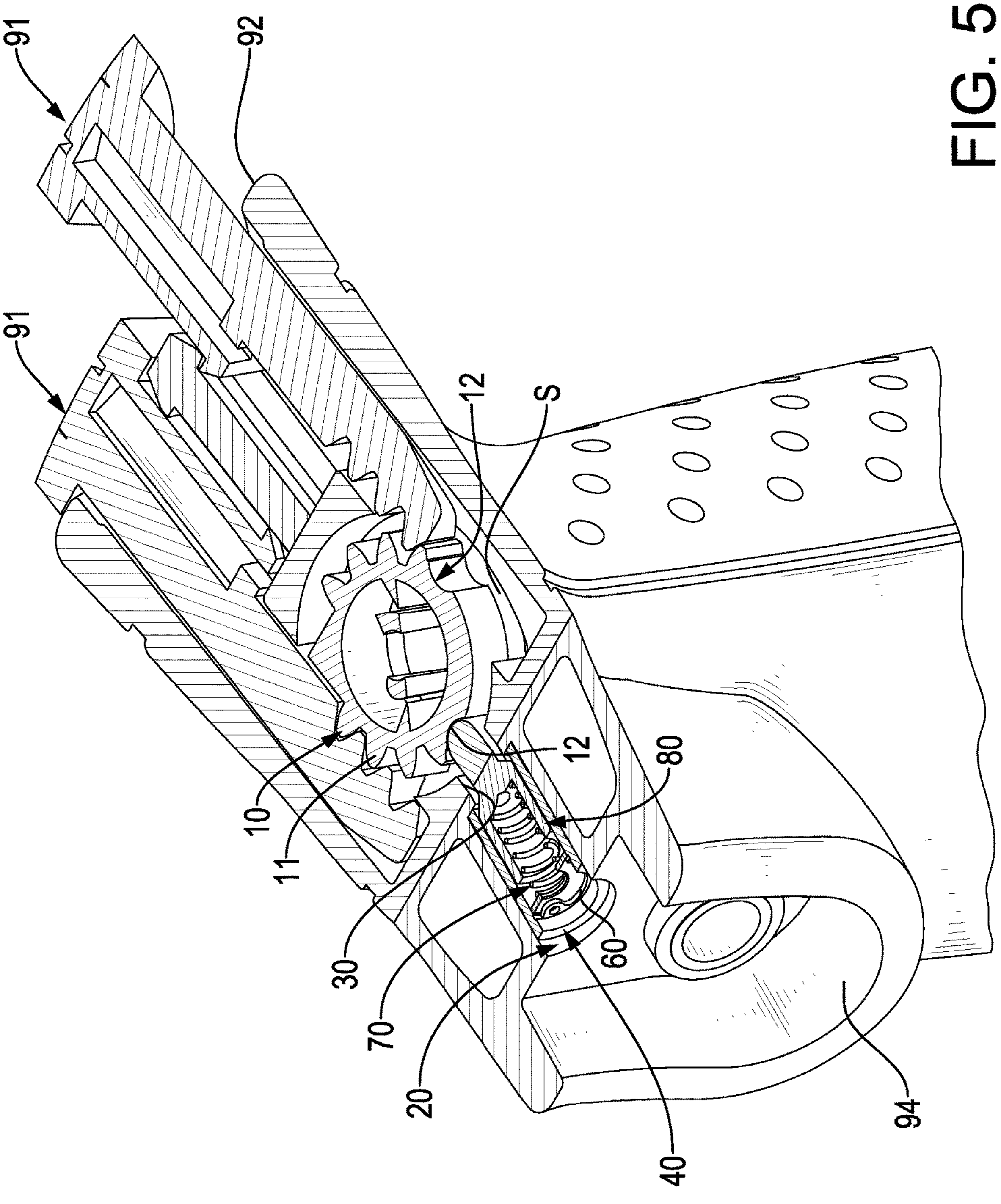
FIG. 5 is an enlarged cross sectional perspective view of the pneumatic tool in FIG. 1.
Figure 6:
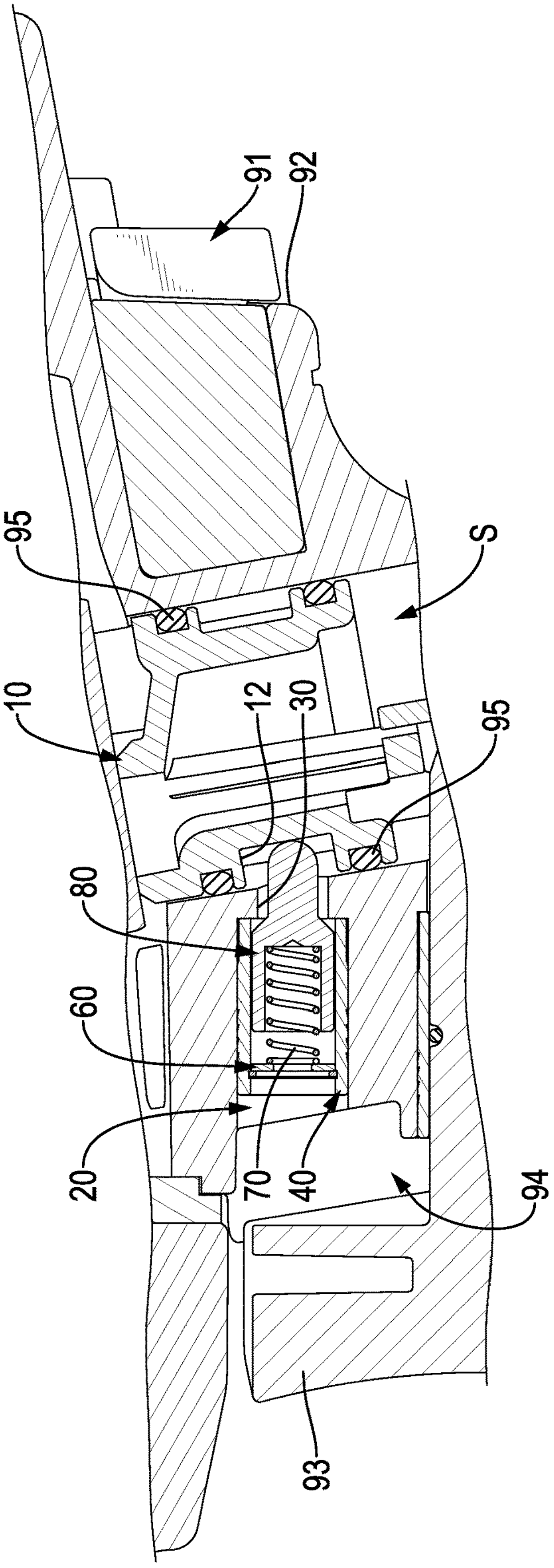
FIG. 6 is an enlarged cross sectional side view of the pneumatic tool in FIG. 1.
Figure 7:
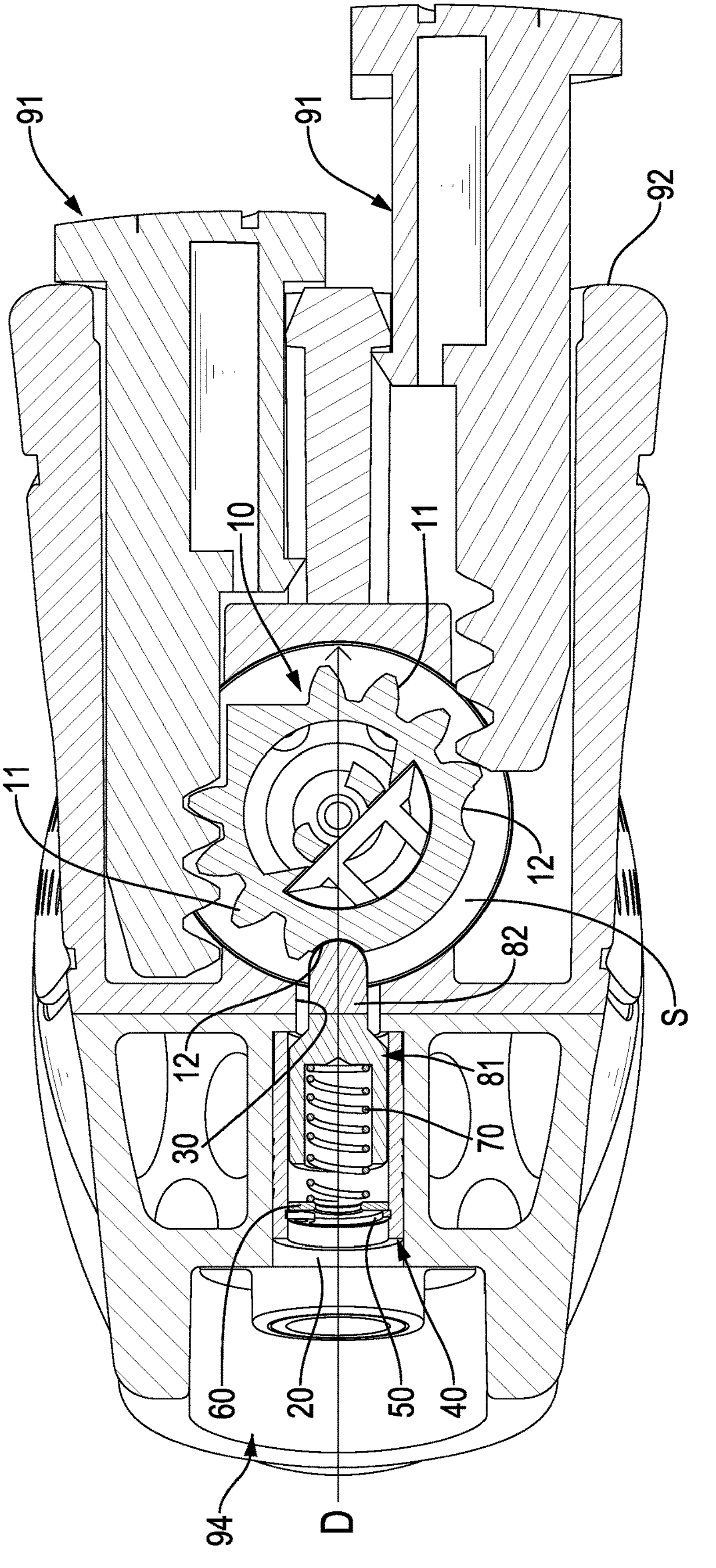
FIG. 7 is an enlarged cross sectional top side view of the pneumatic tool in FIG. 1.

With reference to FIGS. 4 to 6, the setting space S is formed in the shell of the pneumatic tool 90 between the stem-mounting portion 92 and the trigger-mounting portion 94. The selector valve 10 is mounted in the setting space S. The pneumatic tool 90 has two airtight gaskets 95 disposed between an annular wall of the setting space S and the selector valve 10. With reference to FIG. 6, the two airtight gaskets 95 are mounted around an external surface of the selector valve 10 at a spaced interval and abut against the annular wall of the setting space S. With reference to FIGS. 5 and 7, in the present invention, the selector valve 10 has two sets of engaging teeth 11 formed on the external surface of the selector valve 10 at a spaced interval between the two airtight gaskets 95. Each one of the two sets of engaging teeth 11 engages with one of the two switching stems 91. The selector valve 10 can be driven to rotate in a clockwise direction or a counterclockwise direction by pressing the two switching stems 91 to switch the output torque of the pneumatic tool 90 between forward rotation and reverse rotation. In fact, as long as the two switching stems 91 are connected with the selector valve 10, and can respectively drive the selector valve 10 to rotate in two opposite directions, the form of connection between the selector valve 10 and the two switching stems 91 can be selected from any known pneumatic tool on the market, and is not limited by the present invention.

With reference to FIGS. 5 and 7, the selector valve 10 has two positioning indentations 12 formed in the external surface of the selector valve 10 at a spaced interval along a radial direction of the selector valve 10. The two positioning indentations 12 and the two sets of engaging teeth 11 are arranged around the selector valve 10 along a rotation axis of the selector valve 10, and the two positioning indentations 12 are disposed between the two sets of engaging teeth 11. Each one of the two positioning indentations 12 corresponds to one of the two sets of engaging teeth 11 and has a curved face.

With reference to FIGS. 4 and 7, the assembling hole 20 is formed in the shell of the pneumatic tool 90 along a straight direction D from a bottom of the mounting recess of the trigger-mounting portion 94 to the setting space S. The assembling hole 20 communicates with the external environment via the mounting recess of the trigger-mounting portion 94. With reference to FIG. 7, the straight direction D passes through the rotation axis of the selector valve 10. With reference to FIG. 4, the through hole 30 is disposed in the pneumatic tool 90 between the assembling hole 20 and the setting space S, communicates with the assembling hole 20 and the setting space S, and has an inner diameter smaller than an inner diameter of the assembling hole 20.

With reference to FIGS. 5 and 7, the mounting jacket 40 is mounted in the assembling hole 20; preferably, the mounting jacket 40 is mounted in the assembling hole 20 by a tight-fitting method. With reference to FIG. 4, the mounting jacket 40 has a mounting hole 41 and an annular groove 42. The mounting hole 41 is axially formed through the mounting jacket 40, and the mounting jacket 40 is mounted in the assembling hole 20 by arranging the mounting hole 41 along the straight direction D. The mounting hole 41 communicates with the setting space S via the through hole 30. With reference to FIG. 4, the annular groove 42 is annularly formed in an internal surface of the mounting jacket 40 adjacent to the trigger-mounting portion 94. The fixing element 50 may be a C-ring and engages in the annular groove 42 of the mounting jacket 40.

With reference to FIGS. 5 and 7, the spacer 60 and the elastic element 70 are disposed in the mounting hole 41 of the mounting jacket 40, and the elastic element 70 is extended and retracted along the straight direction D. The positioning element 80 is movably inserted into the mounting hole 41 of the mounting jacket 40 along the straight direction D. Furthermore, an extension line of the positioning element 80 along the straight direction D passes through the two switching stems 91. The elastic element 70 has two ends, one of the two ends is securely mounted in the mounting hole 41, and the other one of the two ends pushes the positioning element 80 to press against the selector valve 10. With reference to FIG. 7, the end of the elastic element 70 that is securely mounted in the mounting hole 41 pushes the spacer 60 to abut against the fixing element 50, and the other end of the elastic element 70 pushes the positioning element 80 to move relative to the mounting jacket 40. With reference to FIGS. 4 and 7, the positioning element 80 has a base 81 and a protrusion 82. The base 81 of the positioning element 80 is disposed in the mounting jacket 40, is located in the assembling hole 20, and is tubular. Preferably, in the present invention, the elastic element 70 is a compression spring and the base 81 is mounted around one of the two ends of the elastic element 70. The protrusion 82 is formed on an end of the base 81, extends through the through hole 30, and abuts against the selector valve 10. Furthermore, the protrusion 82 has an abutting end being hemispherical and abutted against the selector valve 10. In addition, the base 81 has an outer diameter larger than an inner diameter of the through hole 30.

In the present invention, first, the fixing element 50, the spacer 60, the elastic element 70, and the positioning element 80 are disposed in the mounting jacket 40, and then the mounting jacket 40 is mounted in the assembling hole 20. In fact, the fixing element 50, the spacer 60, the elastic element 70, and the positioning element 80 can be directly mounted in the assembling hole 20 without mounting in the mounting jacket 40. In the present invention, when assembling the pneumatic tool 90, the fixing element 50, the spacer 60, the elastic element 70, and the positioning element 80 can be firstly mounted in the mounting hole 41 of the mounting jacket 40 and then the mounting jacket 40 is mounted in the assembling hole 20, and this can improve the convenience of assembly of the pneumatic tool 90 of the present invention.

With reference to FIG. 7, when the pneumatic tool 90 of the present invention is in use, one of the two switching stems 91 is pressed by a user, and the output torque of the pneumatic tool 90 is in one of forward rotation and reverse rotation. One of the two positioning indentations 12 of the selector valve 10 aligns with the through hole 30, and the base 80 of the positioning element 80 is pressed by the elastic element 70 to enable the protrusion 82 to move in the corresponding positioning indentation 12 via the through hole 30 and to abut against the curved face of the corresponding positioning indentation 12. Then the positioning element 80 engages with the selector valve 10. With reference to FIG. 6, the engagement between the positioning element 80 and the selector valve 10 is used with friction forces that are generated by the two airtight gaskets 95, and the rotation of the selector valve 10 is limited by the above-mentioned engagement and friction forces. Therefore, the valve-positioning assembly of the pneumatic tool 90 can provide a positioning effect to the selector valve 10.

Figure 8:
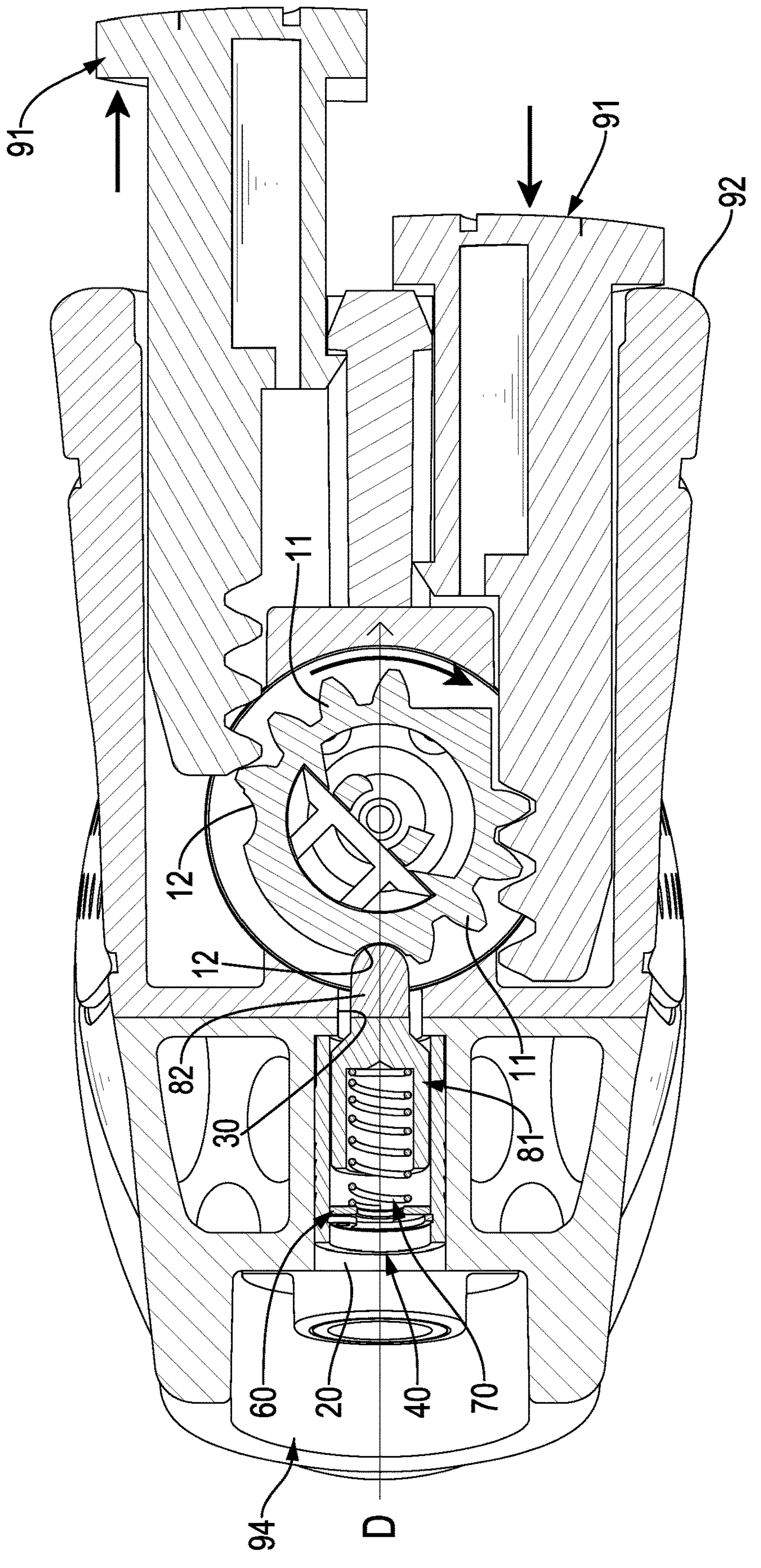
FIG. 8 is an operational and cross sectional top side view of the pneumatic tool in FIG. 1.

With reference to FIG. 8, when the user wants to switch the rotation of the output torque of the pneumatic tool 90, the user can press the other one of the two switching stems 91 to rotate the selector valve 10 in a clockwise direction, and the one of the two switching stems 91 that was originally pressed is moved to return to the original position by the rotation of the selector valve 10. During the rotation of the selector valve 10, the external force that is applied by the user can resist the elastic force of the elastic element 70, the friction force between the protrusion 82 and the selector valve 10, and the friction forces generated by the two airtight gaskets 95, so that the abutting end of the protrusion 82 is moved out of the corresponding positioning indentation 12 to disengage from the curved face of the corresponding positioning indentation 12 by the rotation of the selector valve 1, and abuts against the external surface of the selector valve 10 between the two positioning indentations 12. When the abutting end of the protrusion 82 moves at the external surface of the selector valve 10 between the two positioning indentations 12, the elastic element 70 is compressed more tightly by the movement of the positioning element 80. As the selector valve 10 is rotated by the user pressing the other one of the two switching stems 91, the positioning element 80 is moved away from the corresponding one of the two positioning indentations 12 and is moved toward the other one of the two positioning indentations 12.

Finally, after pressing the other one of the two switching stems 91, the other one of the two positioning indentations 12 is moved with the rotation of the selector valve 10 to align with the through hole 30. Then the compressed elastic element 70 will push the positioning element 80 to move toward the selector valve 10 to enable the protrusion 82 to move into the corresponding positioning indentation 12 that aligns with the through hole 30. The abutting end of the protrusion 82 abuts against the curved face of the corresponding positioning indentation 12 to engage the selector valve 10 with the positioning element 80. The engagement between the positioning element 80 and the selector valve 10 is used with friction forces that are generated by the two airtight gaskets 95, and the rotation of the selector valve 10 is limited by the above-mentioned engagement and friction forces. Therefore, the valve-positioning assembly of the pneumatic tool 90 can provide a positioning effect to the selector valve 10. In addition, the detailed action and principle about an inlet channel, an outlet channel, a cylinder, and an output mechanism of the pneumatic tool 90 are conventional and the features and the structures of the above-mentioned components are not to be described in detail.

In the above-mentioned operation process, regardless of whether the torque output of the pneumatic tool 90 is in forward rotation or reverse rotation, one of the two positioning indentations 12 of the selector valve 10 is moved and aligns with the positioning element 80 by the valve-positioning assembly, and the positioning element 80 is moved into the corresponding positioning indentation 12 by the elastic element 70. Then the selector valve 10 engages with the positioning element 80 and is limited and positioned by the positioning element 80 without rotating, and this can prevent the selector valve 10 from being affected by the anti-shock force acting on the pneumatic tool 90 to rotate automatically, prevent the pneumatic tool 90 from changing the direction of the output torque under unknown circumstances, and greatly improve the safety of the process of using the pneumatic tool 90.

In the present invention, the curved face of each one of the two positioning indentations 12 of the selector valve 10 can enable the positioning element 80 to smoothly separate from the corresponding positioning indentation 12 along the curved face of the corresponding positioning indentation 12, and the user can press the switching stems 91 effortlessly. Furthermore, the abutting end of the protrusion 82 is hemispherical and this can increase the smoothness of the positioning element 80 separating from a corresponding positioning indentation 12 when the user applies force to rotate the selector valve 10 via one of the two switching stems 91. Therefore, the user can press each one of the two switching stems 91 easily.

Furthermore, in the present invention, the positioning element 80 is mounted in and limited by the assembling hole 20 and can only move along the straight direction D that passes through the rotation axis of the selector valve 10 to move in or separate out of one of the two positioning indentations 12. Additionally, in another embodiment, the straight direction D may be parallel to the rotation axis of the selector valve 10, and it is only necessary to set the positioning indentations 12 correspondingly to enable the positioning element 80 to extend into a corresponding positioning indentation 12. Even the positioning element 80 can also adopt a design of pivoting movement. In general, as long as the elastic element 70 presses the positioning element 80 against the selector valve 10, each one of the two positioning indentations 12 can move with the rotation of the selector valve 10 to align with the positioning element 80, and the positioning element 80 can be pushed by the elastic element 70 and extend into a corresponding positioning indentation 12, so as to engage and limit the selector valve 10 to provide a positioning effect to the selector valve 10, and the actual actuation modes of the positioning element 80 are not limited by the present invention.

Even though numerous characteristics and advantages of the present invention have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pneumatic tool comprising:

a shell;

a setting space formed in the shell;

a selector valve rotatably mounted in the setting space and having two positioning indentations formed on the selector valve at a spaced interval;

an assembling hole formed in the shell along a straight direction and communicating with the setting space;

a through hole formed in the shell between the assembling hole and the setting space and communicating with the assembling hole and the setting space; and a positioning element disposed in the shell, movably mounted in the assembling hole along the straight direction, abutted against the selector valve by an elastic element, and having a base mounted in the assembling hole; and a protrusion formed on an end of the base, extended through the through hole, and abutted against one of the two positioning indentations of the selector valve;

wherein the elastic element is mounted in the assembling hole and has two ends, one of the two ends is securely mounted in the assembling hole, and the other one of the two ends abuts against the positioning element;

each one of the two positioning indentations is moved with a rotation of the selector valve to align with the positioning element or moved away from the positioning element; and the protrusion of the positioning element is pushed by the elastic element to move into one of the two positioning indentations when the corresponding positioning indentation is moved to align with the positioning element to engage and limit the selector valve.

2. The pneumatic tool as claimed in claim 1, wherein the base of the positioning element has an outer diameter larger than an inner diameter of the through hole.

3. The pneumatic tool as claimed in claim 2, wherein each one of the two positioning indentations has a curved face formed on the selector valve; and the protrusion of the positioning element abuts against the curved face of one of the two positioning indentations when the positioning element is pushed by the elastic element to move into the corresponding positioning indentation.

4. The pneumatic tool as claimed in claim 3, wherein the protrusion of the positioning element has an abutting end being hemispherical; and the abutting end of the protrusion of the positioning element abuts against the curved face of one of the two positioning indentations when the positioning element is moved into the corresponding positioning indentation.

5. The pneumatic tool as claimed in claim 4, wherein the pneumatic tool has a mounting jacket mounted in the assembling hole; and the elastic element and the positioning element are mounted in the mounting jacket.

6. The pneumatic tool as claimed in claim 5, wherein the mounting jacket has an annular groove annularly formed in an internal surface of the mounting jacket;

the pneumatic tool has a fixing element engaging in the annular groove of the mounting jacket; and a spacer mounted in the mounting jacket; and the end of the elastic element that is securely mounted in the mounting hole pushes the spacer to abut against the fixing element, and the other end of the elastic element abuts against the positioning element.

7. The pneumatic tool as claimed in claim 3, wherein the pneumatic tool has a mounting jacket mounted in the assembling hole; and the elastic element and the positioning element are mounted in the mounting jacket.

8. The pneumatic tool as claimed in claim 7, wherein the mounting jacket has an annular groove annularly formed in an internal surface of the mounting jacket;

the pneumatic tool has a fixing element engaging in the annular groove of the mounting jacket; and a spacer mounted in the mounting jacket; and the end of the elastic element that is securely mounted in the mounting hole pushes the spacer to abut against the fixing element, and the other end of the elastic element abuts against the positioning element.

9. The pneumatic tool as claimed in claim 2, wherein the elastic element is a compression spring; and the base of the positioning element is tubular and is mounted around the elastic element.

10. The pneumatic tool as claimed in claim 9, wherein the pneumatic tool has a mounting jacket mounted in the assembling hole; and the elastic element and the positioning element are mounted in the mounting jacket.

11. The pneumatic tool as claimed in claim 10, wherein the mounting jacket has an annular groove annularly formed in an internal surface of the mounting jacket;

the pneumatic tool has a fixing element engaging in the annular groove of the mounting jacket; and a spacer mounted in the mounting jacket; and the end of the elastic element that is securely mounted in the mounting hole pushes the spacer to abut against the fixing element, and the other end of the elastic element abuts against the positioning element.

12. The pneumatic tool as claimed in claim 2, wherein the pneumatic tool has a mounting jacket mounted in the assembling hole; and the elastic element and the positioning element are mounted in the mounting jacket.

13. The pneumatic tool as claimed in claim 12, wherein the mounting jacket has an annular groove annularly formed in an internal surface of the mounting jacket;

the pneumatic tool has a fixing element engaging in the annular groove of the mounting jacket; and a spacer mounted in the mounting jacket; and the end of the elastic element that is securely mounted in the mounting hole pushes the spacer to abut against the fixing element, and the other end of the elastic element abuts against the positioning element.

14. The pneumatic tool as claimed in claim 1, wherein the pneumatic tool has two switching stems connected to the selector valve;

the shell has a stem-mounting portion for disposing the two switching stems; and the setting space is located between the assembling hole and the stem-mounting portion.

15. The pneumatic tool as claimed in claim 14, wherein the pneumatic tool has a trigger;

the shell has a trigger-mounting portion;

the setting space is located between the trigger-mounting portion and the stem-mounting portion;

the trigger is mounted in a mounting recess of the trigger-mounting portion; and the assembling hole is formed in the shell of the pneumatic tool along the straight direction from a bottom of the mounting recess of the trigger-mounting portion to the setting space.

16. The pneumatic tool as claimed in claim 15, wherein the pneumatic tool has a mounting jacket mounted in the assembling hole; and the elastic element and the positioning element are mounted in the mounting jacket.

17. The pneumatic tool as claimed in claim 14, wherein the pneumatic tool has a mounting jacket mounted in the assembling hole; and the elastic element and the positioning element are mounted in the mounting jacket.

18. The pneumatic tool as claimed in claim 17, wherein the mounting jacket has an annular groove annularly formed in an internal surface of the mounting jacket;

the pneumatic tool has a fixing element engaging in the annular groove of the mounting jacket; and a spacer mounted in the mounting jacket; and the end of the elastic element that is securely mounted in the mounting hole pushes the spacer to abut against the fixing element, and the other end of the elastic element abuts against the positioning element.

19. The pneumatic tool as claimed in claim 1, wherein the pneumatic tool has a mounting jacket mounted in the assembling hole; and the elastic element and the positioning element are mounted in the mounting jacket.

20. The pneumatic tool as claimed in claim 19, wherein the mounting jacket has an annular groove annularly formed in an internal surface of the mounting jacket;

the pneumatic tool has a fixing element engaging in the annular groove of the mounting jacket; and a spacer mounted in the mounting jacket; and the end of the elastic element that is securely mounted in the mounting hole pushes the spacer to abut against the fixing element, and the other end of the elastic element abuts against the positioning element.

* * * * *